United States Patent
Colignon

(10) Patent No.: US 7,716,923 B2
(45) Date of Patent: May 18, 2010

(54) SYSTEM FOR ASSISTING REGENERATION OF POLLUTION MANAGEMENT MEANS IN AN EXHAUST LINE

(75) Inventor: Christophe Colignon, Ermont (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 143 days.

(21) Appl. No.: 11/571,256

(22) PCT Filed: Jun. 21, 2005

(86) PCT No.: PCT/FR2005/050470
§ 371 (c)(1),
(2), (4) Date: Sep. 4, 2008

(87) PCT Pub. No.: WO2006/005870
PCT Pub. Date: Jan. 19, 2006

(65) Prior Publication Data
US 2008/0314024 A1 Dec. 25, 2008

(30) Foreign Application Priority Data
Jun. 23, 2004 (FR) .................................. 04 06860

(51) Int. Cl.
F01N 3/00 (2006.01)
F01N 3/10 (2006.01)
(52) U.S. Cl. ............................ 60/295; 60/286; 60/301
(58) Field of Classification Search .................. 60/286, 60/298, 301
See application file for complete search history.

(56) References Cited

U.S. PATENT DOCUMENTS 6,325,041 B1 12/2001 Mamiya et al.
6,615,577 B2 * 9/2003 Meyer et al. .................. 60/276
2003/0200742 A1 * 10/2003 Smaling ....................... 60/275
2003/0200745 A1 * 10/2003 van Nieuwstadt et al. ..... 60/295

FOREIGN PATENT DOCUMENTS

| EP | 0708809 B | 9/2000 |
|---|---|---|
| EP | 1041262 A | 10/2000 |
| EP | 1405999 A | 4/2004 |
| FR | 2774421 A | 8/1999 |
| FR | 2802572 A | 6/2001 |

OTHER PUBLICATIONS

Bunting, A, "Springing the trap", Automotive Engineer, Mechanical Engineering Publi. Ltd. Bury St. Edmunds, GB, pp. 73-74, May 2000.

* cited by examiner

Primary Examiner—Thomas E Denion
Assistant Examiner—Michael Carton
(74) Attorney, Agent, or Firm—Nicolas E. Seckel

(57) ABSTRACT

The invention concerns a system for assisting regeneration of pollution management means (1) associated with oxidation catalyst forming means implementing an oxygen storage capacity (OSC) function, and integrated in an exhaust line (3) of a motor vehicle diesel engine (4), wherein the engine is associated with common ramp means (7) supplying fuel to the cylinders thereof. The invention is characterized in that it comprises means (8) for determining the number of incomplete regeneration processes of the pollution management means and for comparing same to predetermined threshold values (10) to control the engine (4) in a first lean mixture regeneration operating mode (11) for a number less than the threshold values or in a second regeneration operating mode of engine operation sequences alternating rich mixture and lean mixture operating phases (12) for a number greater than the threshold values.

14 Claims, 2 Drawing Sheets

SYSTEM FOR ASSISTING REGENERATION OF POLLUTION MANAGEMENT MEANS IN AN EXHAUST LINE

BACKGROUND ART

The present invention concerns a system for assisting the regeneration of depollution means associated with means forming oxidation catalyst implementing an OSC function constituting an oxygen reserve, integrated in an exhaust line of a motor vehicle diesel engine.

More particularly, the invention relates to such a system in which the engine is associated with common rail means for the supply of fuel to the cylinders thereof.

To ensure the regeneration of depollution means such as a particle filter, the soot trapped therein is burned thanks to the thermal energy provided by the engine and to the exotherm performed by the conversion of the HC and of the CO on means forming oxidation catalyst placed upstream of the particle filter.

This combustion can be assisted by a catalyst element mixed with the soot, coming, for example, from a regeneration assistance additive, mixed with the fuel for the supply of the engine, or by a catalyst deposited directly on the walls of the particle filter (catalyzed particle filter).

The higher the thermal levels in the exhaust line at the inlet of the particle filter, the shorter the duration of the filter regeneration.

SUMMARY OF THE INVENTION

However, in critical driving conditions, such as, for example, city driving or in traffic jams, the thermal levels reached through the standard strategies for assisting the regeneration of the particle filter can prove insufficient to ensure the correct regeneration of the filter, which can translate into regenerations that last very long and are thus highly fuel-consuming, or even incomplete.

Any strategy of elevating the thermal levels during these critical driving conditions makes it then possible to ensure complete regenerations, to reduce the over-consumption caused by this regeneration of the particle filter, and above all to increase the security margin with respect to the cracking or the breakage of this filter.

The objective of the invention is to propose such a strategy.

To this effect, an object of the invention is a system for assisting the regeneration of depollution means associated with means forming oxidation catalyst implementing an OSC function, constituting an oxygen reserve and integrated in an exhaust line of a motor vehicle diesel engine, in which the engine is associated with common rail means for the supply of fuel to the cylinders thereof, characterized in that it comprises means for determining the number of incomplete regenerations of the depollution means and for comparing this number to predetermined threshold values, to drive the engine in a first operation mode with lean mixture for a number lower than the threshold values or in a second operation mode implementing sequences of operation of the engine alternating operation phases with rich mixture and with lean mixture for a number higher than the threshold values.

According to other characteristics:
the depollution means comprise a particle filter;
the particle filter is catalyzed;
the depollution means comprise a NOx trap;
the fuel comprises an additive intended to be deposited, with the particles with which it is mixed, on the depollution means to facilitate their regeneration;
the fuel comprises an additive forming NOx trap;
the depollution means are impregnated with an SCR formulation, ensuring a CO/HC oxidation function;
the engine is associated with a turbo-compressor.

BRIEF DESCRIPTION OF THE DRAWINGS

The invention will be better understood by reading the following description, given by way of example only and made in reference to the annexed drawings, in which.

DETAILED DESCRIPTION OF PARTICULAR EMBODIMENTS

Figure 1:
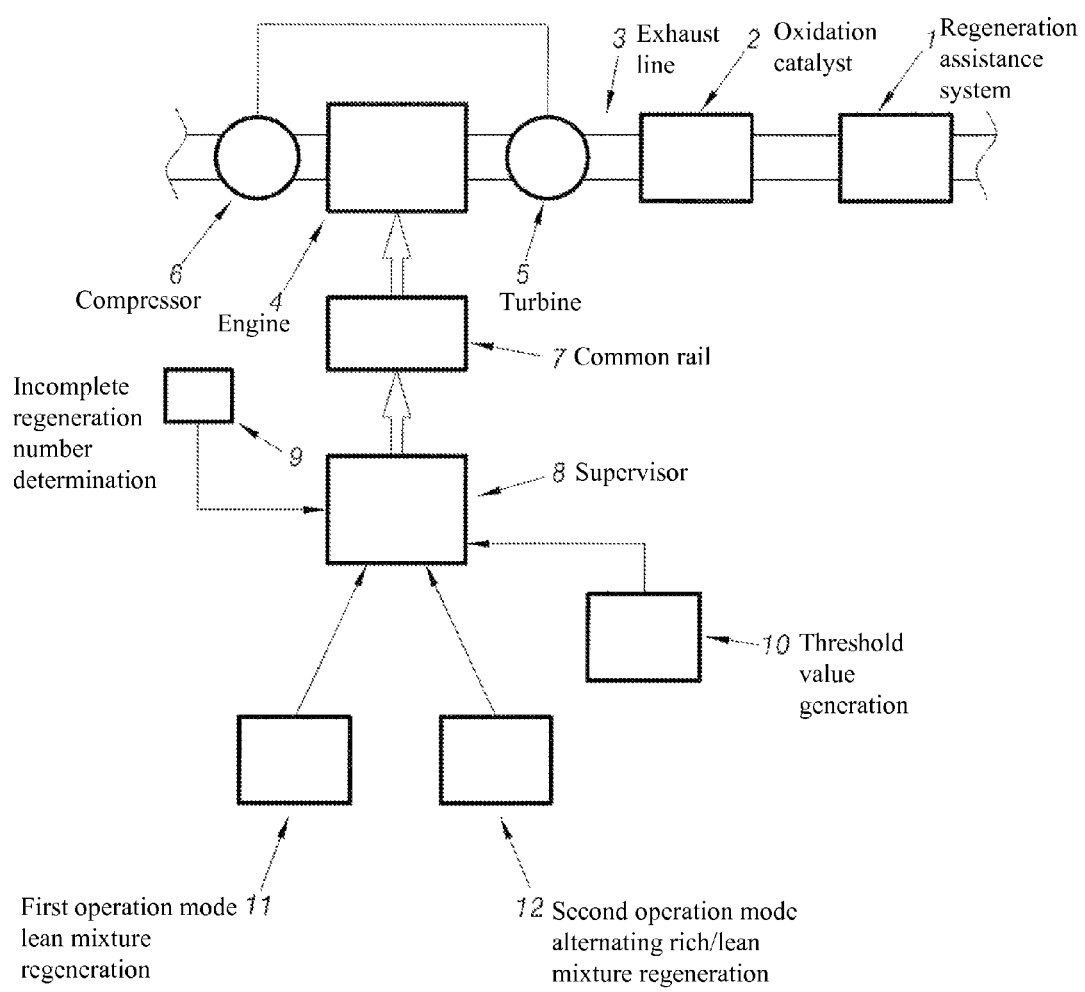
FIG. 1 is a synoptic schematic view illustrating the structure of an assistance system according to the invention.

Indeed, FIG. 1 shows a system for assisting the regeneration of depollution means designated by the general reference 1, associated with means forming oxidation catalyst, implementing an OSC function constituting an oxygen reserve, designated by the general reference 2, and placed in an exhaust line 3 of a motor vehicle engine.

The engine is designated by the general reference 4 and can be associated, for example, with a turbo-compressor whose turbine portion 5 is associated with the exhaust line and whose compressor portion 6 is placed upstream of the engine.

Such means forming oxidation catalyst implementing an OSC function are already known in the state of the art.

The engine is associated with common rail means for the supply of fuel to the cylinders thereof designated by the general reference 7, whose operation is controlled by a supervisor 8.

According to the invention, this system also comprises means for determining the number of incomplete regenerations of the depollution means and means for comparing this number with predetermined threshold values to control the operation of the engine.

These means formed, for example, by the supervisor 8, are then connected to means for determining this number, designated by the general reference 9, providing this number to the supervisor 8, so as to enable this supervisor to compare it to threshold values such as provided by generation means 10 comprising any appropriate means making it possible to establish these threshold values.

The determination of the number of incomplete regenerations of the depollution means is indeed important.

Indeed, when the depollution means such as a particle filter have just been subjected to several consecutive incomplete regenerations, whether these regenerations are partial or failed, the supervisor of the depollution means estimates improperly the amount of soot that is present in the filter.

Indeed, there is, on the one hand, a non-correlation between the mass of particles present in the filter and the loading losses measured at the boundaries of the particle filter (or the counter-pressure measured at the inlet of the filter), and on the other hand, a spatial heterogeneity of the distribution of the soot in the filter, the periphery of the filtering support being often more loaded than the center.

Thus, it is then necessary to be able to ensure a complete regeneration in order to reinitialize the load of the particle filter with the most confidence possible.

The determination of an incomplete regeneration can be performed in any appropriate manner already known of the state of the art, by using, for example, mapping means, the time passed above a certain temperature of the exhaust line, a calculation of the average temperature at the inlet of the depollution means during the regeneration attempt, a mathematical model of decrementation of the mass of soot trapped in the depollution menas, in which the speed of combustion of the soot is a function of the temperature of the gases, etc.

This number thus determined is subsequently compared to threshold values to determine the optimal strategy to be applied.

As a function of the result of this comparison, the supervisor and the common rail means for the supply of fuel are adapted to drive the engine in a first operation mode of regeneration with lean mixture for a number lower than the threshold values, or in a second operation mode of regeneration implementing sequences of operation of the engine alternating operation phases with rich mixture and with lean mixture, for a number higher than the threshold values. These operation phases with rich or lean mixture are established in a standard manner by modifying the parameters for controlling the operation of the engine.

These strategies are designated by the general references 11 and 12, respectively, on this Figure.

Figure 2:
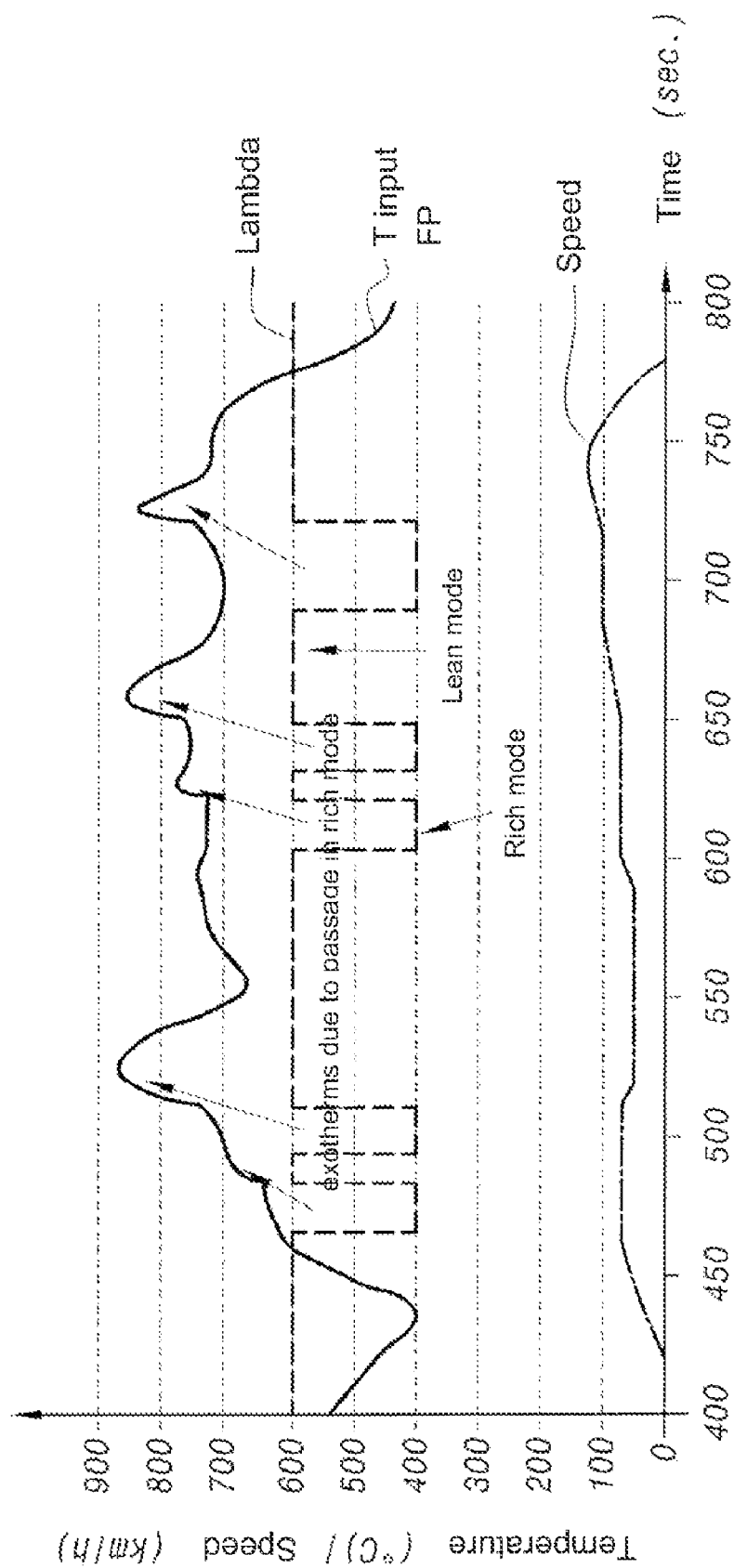
FIG. 2 illustrates the operation thereof.

This is illustrated on FIG. 2, on which the exotherms connected to the passage to the rich operation mode of the engine is clearly visible.

In rich mode, the diesel engine emits a large amount of CO and unburned hydrocarbons in the exhaust gases.

Further, the amount of oxygen present in the gases is highly reduced (lower than 2-3% and sometimes to less than 1%). The passage of these gases in the means forming oxidation catalyst enables the combustion of the CO and of the HC by the oxygen present in the gases.

In order to be able to convert a larger amount of CO and of the HC, it is desirable to make available a larger amount of oxygen.

To this effect, the presence of the component of the OSC type constituting an oxygen reserve (Oxygen Storage Capacity), such as, for example, cerium, which stores oxygen in the form of cerium oxide —$CeO_2$— or a mixed oxide of cerium and zirconium in the means forming oxidation catalyst, makes it possible to release oxygen during the passages of the engine in rich mode.

The combustion of the CO and of the HC is an exothermic reaction and makes it possible to increase the thermal levels at the outlet of the means forming oxidation catalyst, i.e., in fact, the inlet of the particle filter.

In lean operation mode of the engine (mode RG PF), there are much less reducers (CO, HC) than in rich operation mode, but despite a lower oxygen content, compensated in part by the presence of the OSC component, the exotherm produced by the means forming oxidation catalyst is more important in rich mode than in lean regeneration mode of the particle filter.

The passage in rich operation mode makes it thus possible to heat the exhaust gases more, which accelerates the speed of regeneration of the particle filter.

In the case of a particle filter using a regeneration assistance additive, the increase of the thermal levels makes it possible to reduce the dosage of the additive and thus to increase the distance covered by the vehicle before cleanup of the filter.

Indeed, it is known that such an additive can be mixed with the fuel for the supply of the engine to be deposited on the particle filter with the particles with which it is mixed, in order to lower the combustion temperature of the soot trapped therein.

In a standard manner, this additive is indeed present in the particles after combustion of the additivized fuel in the engine.

Of course, different embodiments can be envisioned.

Thus, for example, the depollution means can comprise a particle filter, catalyzed or not, a NOx trap, etc.

These depollution means can also be impregnated with an SCR formulation ensuring a CO/HC oxidation function in a standard manner.

Further, the depollution means and the means forming oxidation catalyst can be integrated into a single and same element, in particular on the same substrate.

By way of example, a particle filter integrating the oxidation function can be envisioned.

Similarly, a NOx trap integrating such an oxidation function can also be envisioned, whether it is additivized or not.

This oxidation and/or NOx trap function can be fulfilled, for example, by an additive mixed with the fuel.

It is thus understood, as illustrated in FIG. 2, that the driving of the engine makes it possible to increase the thermal levels, as compared to a standard operation, in particular for critical loading states, which thus enables a faster and more complete regeneration of the filter.

The invention claimed is:

1. System for assisting the regeneration of depollution means associated with means forming oxidation catalyst implementing an OSC function, constituting an oxygen reserve and integrated in an exhaust line of a motor vehicle diesel engine, in which the engine is associated with these common rail means for the supply in fuel to the cylinders thereof, so that the depollution means comprises a particle filter regenerated by burning soot trapped therein using thermal energy provided by the engine and the oxidation catalyst, wherein said system comprises:

means for determining the number of incomplete regenerations, wherein incomplete regenerations are partial regenerations and failed attempts at regeneration of the particle filter, and for comparing this number to predetermined threshold values, wherein the engine is driven in (i) first operation mode with lean mixture for a number lower than the threshold values or (ii) in a second operation mode implementing sequences of operation of the engine alternating operation phases with rich mixture and with lean mixture for a number higher than the threshold values.

2. System according to claim 1, wherein the particle filter is catalyzed.

3. System according to claim 1, wherein the depollution means further comprise a NOx trap.

4. System according to claim 1, wherein the fuel comprises an additive intended to be deposited, with the particles with which it is mixed, on the depollution means to facilitate their regeneration.

5. System according to claim 1, wherein the fuel comprises an additive forming NOx trap.

6. System according to claim 1, wherein the depollution means are impregnated with an SCR formulation, ensuring a CO/HC oxidation function.

7. System according to claim 1, wherein the engine is associated with a turbo-compressor.

8. Method for assisting the regeneration of depollution means associated with means forming oxidation catalyst implementing an OSC function, constituting an oxygen reserve and integrated in an exhaust line of a motor vehicle diesel engine, in which the engine is associated with these common rail means for the supply in fuel to the cylinders thereof, said method comprising:

regenerating the particle filter by burning soot trapped therein using thermal energy provided by the engine and the oxidation catalyst, determining the number of incomplete regenerations, wherein incomplete regenerations are partial regenerations and failed attempts at regeneration of the particle filter, and comparing this number to predetermined threshold values, driving the engine (i) in a first regeneration operation mode with lean mixture for a number lower than the threshold values, or (ii) in a second regeneration operation mode implementing sequences of operation of the engine alternating operation phases with rich mixture and with lean mixture for a number higher than the threshold values.

9. Method according to claim 8, wherein the particle filter is catalyzed.

10. Method according to claim 8, wherein the depollution means further comprise a NOx trap.

11. Method according to claim 8, wherein the fuel comprises an additive intended to be deposited, with the particles with which it is mixed, on the depollution means to facilitate their regeneration.

12. Method according to claim 8, wherein the fuel comprises an additive forming NOx trap.

13. Method according to claim 8, wherein the depollution means are impregnated with an SCR formulation, ensuring a CO/HC oxidation function.

14. Method according to claim 8, wherein the engine is associated with a turbo-compressor.

* * * * *